United States Patent [19]

Ryntveit et al.

[11] Patent Number: 5,247,970
[45] Date of Patent: Sep. 28, 1993

[54] METHOD FOR FILLING PARTICULATE MATERIAL INTO TUBES

[75] Inventors: Gunne Ryntveit, Porsgrunn; Kjell R. Bayer, Siljan, both of Norway

[73] Assignee: Norsk Hydro a.s., Oslo, Norway

[21] Appl. No.: 847,363

[22] Filed: Mar. 4, 1992

[30] Foreign Application Priority Data

Dec. 20, 1991 [NO] Norway ............................ 915044

[51] Int. Cl.[5] ............................ B65B 1/04; B65B 3/04
[52] U.S. Cl. ............................... 141/1; 141/251; 141/256; 141/258; 141/260; 141/286
[58] Field of Search .................. 141/1, 11, 12, 71, 73, 141/250, 251, 255, 256, 258, 259, 260, 263, 284, 286, 331, 333, 391; 239/379; 15/104.2, 163; 222/406, 407, 564; 366/332, 318; 406/69

[56] References Cited

U.S. PATENT DOCUMENTS

| | | | |
|---|---|---|---|
| 1,912,137 | 5/1933 | Hodell | 15/104.2 |
| 2,295,529 | 9/1942 | Gooden | 141/73 |
| 2,524,560 | 10/1950 | Cote | 141/12 |
| 2,801,773 | 8/1957 | Vitkin | 366/332 |
| 4,532,669 | 8/1985 | Desjardins et al. | 15/163 |

Primary Examiner—Henry J. Recla
Assistant Examiner—Steven O. Douglas
Attorney, Agent, or Firm—Wenderoth, Lind & Ponack

[57] ABSTRACT

A method for filling particulate material into a vertical tube includes conveying the particles downwardly into the tube along a line with a damper in the form of a series of damper brushes each arranged substantially transversely to the line and having a radial extension less than the inner diameter of the tube. The line is pulled up gradually as the tube is filled with particles. The damper can be in the form of brushes that are flexible so that they give or yield gradually when the particles fall down thereon. A wire can be used as the line, to which is fastened a series of substantially equidistant transversely extending brushes, preferably in the form of springs.

17 Claims, 1 Drawing Sheet

METHOD FOR FILLING PARTICULATE MATERIAL INTO TUBES

BACKGROUND OF THE INVENTION

The present invention relates to a method for filling particulate material into a tube. The method relates more particularly to filling a catalyst into a tube and then usually a whole series of vertical tubes, for example in connection with production of ammonia.

The main problem with filling particles into a tube is that voids easily form. This happens especially with particles which easily form bridges in the tube. To attain even filling, the tube can be vibrated, e.g. by tapping or striking the upper part of the tube. However, this is laborious and delays the filling operation. Furthermore, the tube is exposed to extra mechanical stress. When filling catalyst into the tubes, there is a special problem with unevenness because uneven filling and voids cause uneven temperature distribution over the tube. This creates temperature and mechanical stress in the tube and reduces its useful life.

A known way to reduce the above described problem is to first fill particles into a long sock or sock-like member, for example of soft plastic material. The particles or catalysts also can be delivered from the manufacturer in such socks. When filling the tubes, a sock with particles is fastened onto a line and lowered towards the bottom of each tube. By jerking the link, the sock opens below and the particles flow into the tube. Usually a large number of such socks is required to fill one catalyst tube. With this method, it is usual to tap the tubes to improve the degree of filling.

There are several disadvantages with this method. Particularly, if the sock contains voids among the particles, then one easily gets corresponding voids in the tube when the sock is emptied. Even and dense filling of the tube with particles consequently is difficult to achieve with this method. Different particle densities in the tubes cause variations in the pressure drop over the tubes. This results in distortions of gas distribution in a multi-tube reactor. The poor reproducibility with use of such filling operation means that the tubes must be exposed to extra tapping to secure reasonably even gas distribution over the tubes. In addition, the method is laborious. One is fettered to one packaging form and must often pay to get the particles filled into the socks. Systematic errors also may arise because of operator-dependent errors, both with filling the socks and with filling the tubes.

A special way to attain good and even packing of particles into a tube is to fill the tube with water and then to pour in the particles. However, this method requires that the water subsequently be completely removed. This removal and necessary subsequent drying takes a long time and to this must be added that not all types of particles/catalysts can endure exposure to water.

A method for filling a tube with a catalyst by adding the catalyst to the upper part of the tube by means of a transporter comprising a slowly rotating arrangement is known from RD Patent Application RD-253040-A. The catalyst is transported from a container through a duct in which there is a rod with oblique/transverse propeller wings or brushes. The catalyst particles are then transported to the upper end of the catalyst tube and fall smoothly into the tube. In order to get even filling of the tube, the particles must be added slowly.

Further, the particles, especially during the first part of the filling operation, have a long drop and therefore may be crushed or broken during such fall. Consequently, one can get an uneven packing of particles over the vertical length of the tube. The filling time with this method also will be long.

SUMMARY OF THE INVENTION

The object of the present invention is to provide a method that does not have the disadvantages of the known methods, and more particularly that achieves a quick, gentle, and even filling of particles into tues.

In order to obtain quick filling of the tubes, particles were emptied directly down into the tubes, but in order to avoid crushing of the particles various approaches were tried to soften the fall of the particles. Rods with transverse dampers were lowered down into the tube and particles were filled down in the tube. This seemed to work well, provided that the particles fell evenly downwardly from one damper to another. By pulling the rod upwardly during filling, a relatively even filling was attained. However, in most cases, a rigid rod was awkward and space-consuming to use. Therefore, there was developed flexible means in the form of a line including an articulated rod, a wire, chain or the like with a damper means in the form of a plurality of damper members shaped in different ways but each having a radial extension smaller than the inner radius of the tube. The damper mean reduces the falling velocity of the particles and diverts the particles from falling in straight downward paths. The type and shape of the damper means and line can be adapted in particular cases to the actual type of particles and the tube diameter. Somewhat flexible damper means seemed to be advantageous to use. An advantageous embodiment was found to be to form plural individual damper brushes of bristles of spring steel or relatively stiff springs twisted onto a wire or fastened in some other manner to the line/chain to form the damper means. It also appeared that with use of such a line with damper means, bridge formation was avoided, even with particulate material known to be susceptible to easily forming bridges during filling.

More complete testing was begun. A funnel was set up on each tube, and a line with a damper in the form of a series of damper brushes was conveyed down into the tube. Then the particles were poured down into the tube. A very quick, even and reproducible filling was attained, particularly if the line was jerked a little during the filling operation, while simultaneously being lifted up gradually as the tube filled.

BRIEF DESCRIPTION OF THE DRAWINGS

The invention will not be explained in detail with reference to the accompanying drawings, wherein.

DETAILED DESCRIPTION OF THE INVENTION

1 FIG. shows a tube 1, e.g. a catalyst tube. Particles 2 are filled into the tube and as illustrated filling is uneven since voids 3 are produced.

Figure 2:
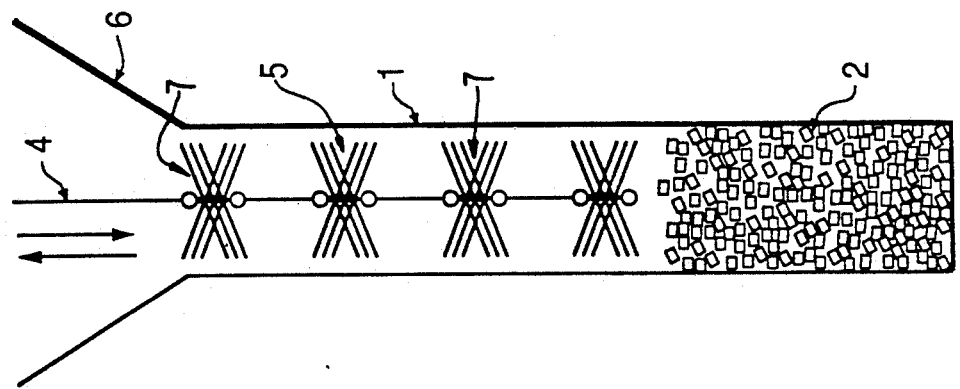
FIG. 2 is a similar view showing a tube filled in accordance with the invention.
Figure 1:
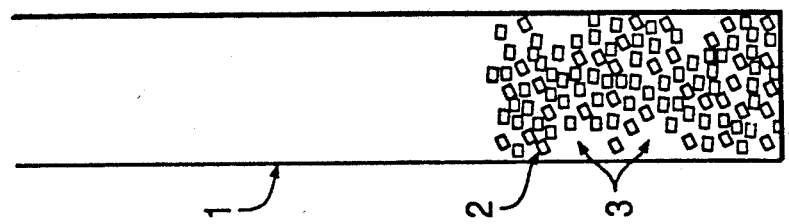
FIG. 1 is a schematic view showing a tube filled in a conventional manner.

FIG. 2 shows how a tube can be filled by the inventive method and accessories are used in accordance with the invention. A line 4, such as a wire, chain or the like, is provided with substantially transverse damper means 5, here shown as a plurality of vertically spaced brushes 7. The line 4 can be moved, primarily vertically, and is pulled gradually up out of the tube as the tube is filled. The particles pour down into the tube 1 through a funnel 6 that is removed after filling is completed. The particles can of course be added in other ways, e.g. by means of a transporter such as described in the above-specified patent application.

Figure 3:
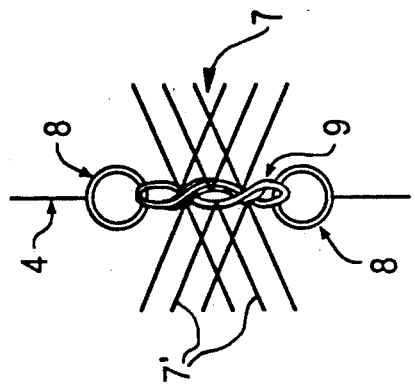
FIG. 3 is an elevation view showing in detail an embodiment of a means used during filling in accordance with the invention.

FIG. 3 shows one damper member in the form of a brush 7 of the damper means 5 in detail and how substantially transverse brush bristle members 7' such as springs are twisted onto a string 9 fastened to the line 4 by rings 8. The distance between brushes 7 of the damper means 5 is usually substantially equal, but also can vary. Shaping of the damper, e.g. as to length, stiffness, number of individual brushes, etc., can be adapted to the material to be filled into the tube 1.

EXAMPLE 1

A series of tests was performed by filling particles into a tube in accordance with a conventional method and the inventive method. During such testing, an elongated transparent tube with a length of 4 m and with an inner diameter of 100 mm was used. Catalyst particles of 17 mm × 17 mm × 6 mm were used.

The tube first was filled by lowering socks with particles down into the tube and then pulling the socks up so that they emptied. In order to fill the tube, four of these standard socks were consumed. There was observed some crushing of particles and quite uneven filling of the tube, with a number of empty spaces and formation of some bridges of particles in the tube. It appeared that the particles from the socks were transferred so directly downwardly into the tube that empty spaces in the socks substantially were transferred to or rediscovered in the tube. Average filling time for ten tests was 153 seconds. Average bulk density of the catalyst in the tube was 1.00 kg/liter. Reproducibility, expressed as standard deviation of bulk density, was 0.02.

A series of corresponding tests with the same tube and the same type of particles was performed in accordance with the invention and as illustrated in FIGS. 2 and 3. The distance between the brushes of the damper means was about 50 cm. No crushing or particles was observed. There was a very even distribution of particles in the tube without any empty spaces. Average filling time for ten tests was 105 seconds. Average bulk density was 1.11 kg/liter. Reproducibility, i.e. standard deviation of bulk density, was 0.01.

A series of further tests with other types of particles was performed. These tests were performed in accordance with the invention and showed that also for these particles quick filling of the tubes was attained, and that the tubes were evenly filled without bridge formation or empty spaces.

With the present invention, a novel and more reproducible filling method, far quicker than those known, has been attained. The method is gentle to the particles such that crushing of particles during the filling operation is avoided. An even filling of the tube is also obtained, and thus one result has been avoidance of uneven temperature distribution when a tube filled with catalyst is in operation.

Further, an even density of particles in the tubes is attained without exposing them to tapping/vibration which is both time-consuming and damaging to the tubes. Consequently, time is saved both during filling and also since the tubes do not have to be tapped as is usual with known methods.

The method is simple and is to only a very small degree dependent upon whoever is the particular operator during the filling process. In addition, errors connected with filling of particles into socks are avoided. A substantial degree of freedom regarding packaging and the form of transport for the particles also is obtained.

We claim:

1. A method of filling particles of particulate material into the interior of a tube with reduced breakage of said particles and to ensure substantially even and complete filling of said interior by said particles without the formation of void spaces therein, said method comprising:
   positioning within said interior a line having spaced along the length thereof a plurality of damper members, with each said damper member connected to said line and extending substantially transversely thereof having a radial dimension less than an inner radius of said tube, and with each said damper member occupying a substantially major portion of the transverse cross section of said interior of said tube;
   filling said particles downwardly into said interior of said tube along said line and over said damper members; and
   as said interior of said tube is filled with said particles, gradually pulling said line and said damper members upwardly;
   whereby said damper members divert said particles from falling downwardly in straight paths and reduce the falling velocity of said particles.

2. A process as claimed in claim 1, comprising providing each said damper member as a brush-like member having substantially radially extending bristles.

3. A process as claimed in claim 2, comprising providing said bristles to be sufficiently flexible such that said bristles gradually yield downwardly when said particles fall thereon.

4. A process as claimed in claim 3, wherein said bristles comprise springs.

5. A process as claimed in claim 4, wherein said springs are formed of spring steel.

6. A process as claimed in claim 1, comprising providing said line as a wire.

7. A process as claimed in claim 1, comprising providing said damper members to be spaced equidistantly along said line.

8. A process as claimed in claim 7, wherein said damper members comprise brushes with transversely extending bristles.

9. A process as claimed in claim 8, wherein said bristles comprise springs.

10. In a process for filling particles of particulate material downwardly into the interior of a tube, the improvement wherein said filling comprises:
    supplying said particles downwardly into said interior along and over a line having extending therefrom damping means for diverting said particles from falling downwardly in straight paths in said interior and thereby for reducing the falling velocity of said particles, with said damper means including at least one damper member connected to said line extending substantially transversely thereof and having a radial dimension less than an inner radius of said tube, and with said damper member aligned to occupy substantially a major portion of the transverse cross section of said interior of said tube; and as said interior of said tube is filled with said particles, gradually pulling said line and said damper means upwardly relative to said tube.

11. The improvement claimed in claim 10, comprising providing said damping means as a plurality of said damping members spaced along the length of said line.

12. The improvement claimed in claim 11, comprising providing said damper members to be spaced equidistantly along said line.

13. The improvement claimed in claim 10, comprising providing said damper member to be a brush-like member having substantially radially extending bristles.

14. The improvement claimed in claim 13, comprising providing said bristles to be sufficiently flexible such that said bristles gradually yield downwardly when said particles fall thereon.

15. The improvement claimed in claim 14, wherein said bristles comprise springs.

16. The improvement claimed in claim 15, wherein said springs are formed of spring steel.

17. The improvement claimed in claim 10, comprising providing said line as a wire.

* * * * *